(12) United States Patent
Dodwell

(10) Patent No.: US 6,429,170 B1
(45) Date of Patent: Aug. 6, 2002

(54) SORBENTS FOR DESULFURIZING GASOLINES AND DIESEL FUEL

(75) Inventor: Glenn W. Dodwell, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/580,611

(22) Filed: May 30, 2000

(51) Int. Cl.[7] .............................. B01J 20/00; B01J 20/30
(52) U.S. Cl. .................. 502/400; 502/406; 502/407; 502/415; 502/439; 502/514; 502/517
(58) Field of Search ............................... 208/208 R, 243, 208/244, 246, 247, 249, 299; 502/400, 406, 407, 415, 439, 514, 517, 504

(56) References Cited

U.S. PATENT DOCUMENTS

| | | | | |
|---|---|---|---|---|
| 4,011,175 A | * | 3/1977 | Preus | 252/427 |
| 4,061,476 A | * | 12/1977 | Hölter et al. | 55/77 |
| 4,064,071 A | * | 12/1977 | Gilmour | 252/455 R |
| 4,171,285 A | * | 10/1979 | Mulaskey | 252/455 R |
| 4,201,751 A | * | 5/1980 | Hölter et al. | 423/210 |
| 4,871,710 A | * | 10/1989 | Denny et al. | 502/414 |
| 5,866,749 A | * | 2/1999 | Ou | 585/845 |
| 6,042,798 A | * | 3/2000 | Masuda et al. | 423/244.01 |
| 6,254,766 B1 | * | 7/2001 | Sughrue et al. | 208/244 |

FOREIGN PATENT DOCUMENTS

| | | | | |
|---|---|---|---|---|
| JP | 63264137 A | * | 11/1988 | |
| WO | WO 01/15804 A1 | | 3/2001 | B01J/23/80 |
| WO | WO 01/15805 A1 | | 3/2001 | B01J/27/13 |

OTHER PUBLICATIONS

Kohl et al. Gas Purification (4th ed.) Gulf Publishing Houston TX, ISBN 0–87201–314–6, pp. 738–739, 1985.*

* cited by examiner

*Primary Examiner*—Stanley S. Silverman
*Assistant Examiner*—Timothy C Vanoy
(74) *Attorney, Agent, or Firm*—Lynda S. Jolly

(57) ABSTRACT

Attrition resistant, sorbent compositions for the removal of elemental sulfur and sulfur compounds, such as hydrogen sulfide and organic sulfides, from cracked-gasoline and diesel fuels are prepared by the impregnation of a sorbent support comprising zinc oxide, expanded perlite, and alumina with a promoter such as nickel, nickel oxide or a precursor of nickel oxide followed by reduction of the valence of the promoter metal in the resulting promoter metal sorbent support composition.

27 Claims, No Drawings

SORBENTS FOR DESULFURIZING GASOLINES AND DIESEL FUEL

FIELD OF THE INVENTION

This invention relates to the removal of sulfur from fluid streams of cracked-gasolines and diesel fuels. In another aspect, this invention relates to sorbent compositions suitable for use in the desulfurization of fluid streams of cracked-gasolines and diesel fuels. A further aspect of this invention relates to a process for the production of sulfur sorbents for use in the removal of sulfur bodies from fluid streams of cracked-gasolines and diesel fuels.

BACKGROUND OF THE INVENTION

The need for cleaner burning fuels has resulted in a continuing world-wide effort to reduce sulfur levels in hydrocarbon-containing fluids such as gasoline and diesel fuels. The reduction of sulfur in such hydrocarbon-containing fluids is considered to be a means for improving air quality because of the negative impact the sulfur has on the performance of sulfur-sensitive items such as auotomotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Most of the sulfur in a hydrocarbon-containing fluid such as gasoline comes from thermally processed gasolines. Thermally processed gasolines such as, for example, thermally cracked gasoline, visbreaker gasoline, coker gasoline and catalytically cracked gasoline (hereinafter collectively referred to as "cracked-gasoline") contains, in part, olefins, aromatics, sulfur, and sulfur-containing compounds.

Since most gasolines, such as for example automobile gasolines, racing gasolines, aviation gasolines, boat gasolines, and the like contain a blend of, at least in part, cracked-gasoline, reduction of sulfur in cracked-gasoline will inherently serve to reduce the sulfur levels in most gasolines such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the real debate has focused on the required level of reduction, the geographical areas in need of lower sulfur gasoline, and the time frame for implementation.

As the concern over the impact of automotive air pollution continues, it is clear that further efforts to reduce the sulfur levels in automotive fuels will be required. While the current gasoline products contain about 330 parts per million (ppm), the U.S. Environmental Protection Agency recently issued regulations requiring the average sulfur content in gasoline to be less than 30 ppm average with an 80 ppm cap. By 2006, the standards will effectively require every blend of gasoline sold in the United States to meet the 30 ppm level.

In addition to the need to be able to produce low sulfur content automotive fuels, there is also a need for a process which will have a minimal effect on the olefin content of such fuels so as to maintain the octane number (both research and motor octane number). Such a process would be desirable since saturation of olefins greatly affects the octane number. Such adverse effect on olefin content is generally due to the severe condition normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur-containing compounds to be removed from cracked-gasoline. In addition, there is a need to avoid a system wherein the conditions are such that the aromatic content of the cracked-gasoline is also lost through saturation. Thus, there is a need for a process wherein desulfurization is achieved and the octane number is maintained.

In addition to the need for removal of sulfur from cracked-gasolines, there is also presented to the petroleum industry a need to reduce the sulfur content in diesel fuels. In removing sulfur from diesel fuels by hydrodesulfurization, the cetane is improved but there is a large cost in hydrogen consumption. Such hydrogen is consumed by both hydrodesulfurization and aromatic hydrogenation reactions.

Thus, there is a need for a process of desulfurization without a significant consumption of hydrogen so as to provide a more economical process for the treatment of cracked gasolines and diesel fuels.

As a result of the lack of success in providing a successful and economically feasible process for the reduction of sulfur levels in cracked-gasolines and diesel fuels, it is apparent that there is still a need for a better process for the desulfurization of such hydrocarbon-containing fluids which has minimal effect on octane levels while achieving high levels of sulfur removal.

Traditionally, sorbent compositions used in processes for the removal of sulfur from hydrocarbon-containing fluids have been agglomerates utilized in fixed bed applications. Because of the various process advantages of fluidized beds, hydrocarbon-containing fluids are sometimes used in fluidized bed reactors. Fluidized bed reactors have advantages over fixed bed reactors such as better heat transfer and better pressure drop. Fluidized bed reactors generally use reactants that are particulates. The size of these particulates is generally in the range of about 1 micron to about 1000 microns. However, the reactants used generally do not have sufficient attrition resistance for all applications. Consequently, finding a sorbent with sufficient attrition resistance that removes sulfur from these hydrocarbon-containing fluids and that can be used in fluidized, transport, moving, or fixed bed reactors is desirable and would be of significant contribution to the art and to the economy.

It is thus an object of the present invention to provide a novel sorbent composition that can be used for the removal of sulfur from cracked-gasolines and diesel fuels.

Another object of the present invention is to provide a process for the production of novel sorbent compositions which are useful in the desulfurization of cracked-gasolines and diesel fuels.

Another object of the present invention is to provide a process for the removal of sulfur from cracked-gasolines and diesel fuels which minimizes the consumption of hydrogen and minimizes the saturation of olefins and aromatics contained in such streams.

A still further object of the present invention is to provide a desulfurized cracked-gasoline that contains less than about 100 parts per million, preferably less than 50 parts per million, of sulfur based on the weight of the desulfurized cracked-gasoline, and which contains essentially the same amount of olefins and aromatics as are in the cracked-gasoline from which such desulfurized cracked-gasoline was made.

Other aspects, objectives, and advantages of the present invention will be apparent from the detailed description of the invention and the appended claims.

SUMMARY OF THE INVENTION

The present invention is based upon my discovery that through the utilization of expanded perlite to form a sorbent base composition comprising zinc oxide, expanded perlite and alumina, there is provided a novel base composition for the formation of a sorbent system by the addition of a promoter metal thereto which permits both the control of the attrition value of the resulting sorbent system and the control of the sorbent system activity.

More specifically, in accordance with the present invention, I have discovered that use of expanded perlite as the silica source in a system comprising zinc oxide, silica, alumina, and a promoter metal resulted in a sorbent composition which permitted variance of the zinc oxide content and the alumina content of the based support composition thereby permitted the variance of the sorbent life when used in the desulfurization of cracked-gasolines or diesel fuels as well as achieving a variance on the attrition value of the sorbent system through the altering of the alumina content of the base support.

Thus, in one aspect of the present invention, there is provided a novel sorbent composition suitable for the desulfurization of cracked-gasolines and diesel fuels which comprises a base support component consisting essentially of zinc oxide, expanded perlite, alumina, and a promoter component wherein the valence of such promoter component is substantially reduced and such reduced-valence promoter component is present in an amount which is effective in the removal of sulfur from cracked-gasolines or diesel fuels.

In accordance with another aspect of the present invention, there is provided a process for the preparation of a novel sorbent system which comprises contacting a base support consisting essentially of zinc oxide, expanded perlite, and alumina so as to form a mixture thereof selected from the group consisting of a wet mix, a dough, a paste, or a slurry; particulating such mixture so as to form a particulate selected from the group consisting of a granule, an extrudate, a tablet, a sphere, a pellet, or a microsphere; drying such particulate to form a dried particulate; calcining such dried particulate to form a calcined particulate; distributing a promoter component upon such dried and calcined particulate to form a promoted particulate; drying such promoted particulate to form a dried promoted particulate; calcining such dried promoted particulate to form a calcined promoted particulate; and reducing such calcined promoted particulate with a suitable reducing agent, such as hydrogen, so as to produce a sorbent composition having a substantially reduced, preferably zero-valence promoter component distributed on such based sorbent composition in an amount which is effective in removing sulfur from a cracked-gasoline or diesel fuel stream. The attrition resistance of the sorbent composition can be enhanced by varying the concentration of the alumina component in the base support. The life of the sorbent system for the desulfurization of cracked-gasolines or diesel fuels is controlled through the control of the zinc oxide content of the base support component of the sorbent system.

In accordance with a further aspect of the present invention, there is provided a process for the desulfurization of cracked-gasolines and diesel fuels, which comprises desulfurizing in a desulfurization zone such a hydrocarbon-containing fluid with a sorbent composition, separating the desulfurized hydrocarbon-containing fluid from the sulfurized sorbent composition, regenerating at least a portion of the sulfurized sorbent composition to produce a regenerated, desulfurized sorbent composition; activating at least a portion of the regenerated, desulfurized sorbent composition to produce an activated, regenerated, desulfurized sorbent composition; and thereafter returning at least a portion of the activated, regenerated, desulfurized sorbent composition to the desulfurization zone.

DETAILED DESCRIPTION OF THE INVENTION

The present invention is based upon the discovery by applicant that through the use of milled expanded perlite in the formation of a sorbent support comprising zinc oxide, milled expanded perlite, and a binder there was produced a base support in which the zinc oxide content and binder content could be adjusted so as to provide an attrition resistance sorbent as well as the extension of the useful life of the sorbent system.

More specifically, it was discovered that through the use of milled expanded perlite in the formation of a zinc oxide, crushed expanded perlite, and a binder such as alumina there was achieved a base support composition which permitted the variation of the zinc oxide and binder content therein such that following impregnation of the base support with a promoter metal the resulting system exhibited attrition resistance as well as extended life when following the reduction of same with hydrogen. The resulting sorbent composition was employed in the desulfurization of a cracked-gasoline and/or diesel fuel.

The term "gasoline" denotes a mixture of hydrocarbons boiling in the range of from about 100° F. to about 400° F., or any fraction thereof. Examples of suitable gasoline include, but are not limited to, hydrocarbon streams in refineries such as naphtha, straight-run naphtha, coker naphtha, catalytic gasoline, visbreaker naphtha, alkylate, isomerate, reformate, and the like and combinations thereof.

The term "cracked-gasoline" denotes a mixture of hydrocarbons boiling in the range of from about 100° F. to about 400° F., or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combinations thereof. Thus, examples of suitable cracked-gasoline include, but are not limited to, coker gasoline, thermally cracked gasoline, visbreaker gasoline, fluid catalytically cracked gasoline, heavy oil cracked gasoline, and the like and combinations thereof. In some instances, the cracked-gasoline may be fractionated and/or hydrotreated prior to desulfurization when used as a hydrocarbon-containing fluid in a process of the present invention.

The term "diesel fuel" denotes a mixture of hydrocarbons boiling in the range of from about 300° F. to about 750° F., or any fraction thereof. Examples of suitable diesel fuels include, but are not limited to, light cycle oil, kerosene, jet fuel, straight-run diesel, hydrotreated diesel, and the like and combinations thereof.

The term "sulfur" denotes sulfur in any form such as elemental sulfur or a sulfur compound normally present in a hydrocarbon-containing fluid such as cracked gasoline or diesel fuel. Examples of sulfur which can be present during a process of the present invention usually contained in a hydrocarbon-containing fluid, include, but are not limited to, hydrogen sulfide, carbonyl sulfide (COS), carbon disulfide ($CS_2$), mercaptans (RSH), organic sulfides (R-S-R), organic disulfides (R-S-S-R), thiophene, substituted thiophenes, organic trisulfides, organic tetrasulfides, benzothiophene, alkyl thiophenes, alkyl benzothiophenes, alkydibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

The term "fluid" denotes gas, liquid, vapor, and combinations thereof.

The term "gaseous" denotes that state in which the hydrocarbon-containing fluid, such as cracked-gasoline or diesel fuel, is primarily in a gas or vapor phase.

The term "attrition resistance" denotes the attrition resistance of a sorbent composition of the present invention measured as the Davison Index. The term "Davison Index" ("DI") refers to a measure of a sorbent's resistance to particle size reduction under controlled conditions of turbulent motion. The Davison Index represents the weight percent of the over 20 micrometer particle size fraction which is reduced to particle sizes of less than 20 micrometers under test conditions. The Davison Index is measured using a Jet cup attrition determination method. The Jet cup attrition determination method involves screening a 5 gram sample of sorbent to remove particles in the 0 to 20 micrometer size range. The particles above 20 micrometers are then subjected to a tangential jet of air at a rate of 21 liters per minute introduced through a 0.0625 inch orifice fixed at the bottom of a specially designed Jet cup (1" I.D.×2" height) for a period of 1 hour. The Davison Index ("DI") is calculated as follows:

$$DI = \frac{\text{Weight of 0 to 20 micrometer material formed during test}}{\text{Weight of original 20 + micrometer fraction being tested}} \times$$

$$100 \times \text{correction factor.}$$

Correction factor (presently 0.3) is determined by using a known calibration standard to adjust for differences in jet cup dimensions and wear.

The term "support component" denotes any component or combination of such components which can be used as a support for a sorbent composition of the present invention to help promote the desulfurization process disclosed herein. Examples of a suitable support component include, but are not limited to, zinc oxide in association with a suitable binder such as alumina and expanded perlite. A presently preferred support component is that comprising zinc oxide, expanded perlite, and alumina.

The term "promoter component" denotes any component which can be added to the sorbent composition of the present invention to help promote the desulfurization of cracked-gasolines or diesel fuels. Such promoter components are at least one metal, metal oxide, or precursor for the metal oxide wherein the metal component is selected from the group consisting essentially of nickel, cobalt, iron, manganese, copper, zinc, molybdenum, tungsten, silver, tin, antimony, and vanadium.

Some examples of promoter metal-containing compounds include metal acetates, metal carbonates, metal nitrates, metal sulfates, metal thiocyanates, and the like and combinations thereof. Preferably, the metal of such promoter component is nickel. In a preferred embodiment of the present invention, the sorbent composition is promoted with a precursor of a nickel oxide such as nickel nitrate, more preferably nickel nitrate hexahydrate.

The term "metal" denotes metal in any form such as elemental metal or a metal-containing compound.

The term "metal oxide" denotes metal oxide in any form such as a metal oxide or a metal oxide precursor.

During the preparation of a sorbent composition of the present invention, the promoter component selected from the group consisting of metals, metal oxides, and the like and combinations thereof may initially be in the form of a metal-containing compound and/or a metal oxide precursor. It should be understood that when the promoter component is initially a metal-containing compound and/or a metal oxide precursor, a portion of, or all of, such compound and/or precursor may be converted to the corresponding metal or metal oxide of such compound and/or precursor during the inventive process disclosed herein.

The term "perlite" as used herein is the petrographic term for a siliceous volcanic rock which naturally occurs in certain regions throughout the world. The distinguishing feature, which sets it apart from other volcanic minerals, is its ability to expand four to twenty times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. It is these diminutive glass sealed bubbles which account for its light weight. Expanded perlite can be manufactured to weigh as little as 2.5 lbs per cubic foot.

Typical chemical analysis 1 properties of expanded perlite are: silicon dioxide 73%, aluminum oxide 17%, potassium oxide 5%, sodium oxide 3%, calcium oxide 1%, plus trace elements.

Typical physical properties of expanded perlite are: softening point 1600–2000° F., fusion point 2300° F.–2450° F., pH 6.6–6.8, and specific gravity 2.2–2.4.

The term "expanded perlite" as used herein refers to the spherical form of perlite which has been expanded by heating the perlite siliceous volcanic rock to a temperature above 1600° F.

The term "particulate expanded perlite" or "milled perlite" as used herein denotes that form of expanded perlite which has been subjected to crushing so as to form a particulate mass wherein the particle size of such mass is comprised of at least 97% of particles having a size of less than 2 microns.

The term "milled expanded perlite" is intended to mean the product resulting from subjecting expanded perlite particles to milling or crushing.

The zinc oxide will generally be present in the sorbent support composition in an amount in the range of from about 10 to about 90 weight percent zinc oxide based on the total weight of the sorbent composition, preferably in an amount in the range of from about 40 to about 80 weight percent zinc oxide.

The zinc oxide used in the preparation of a sorbent support composition of the present invention can either be in the form of zinc oxide or in the form of one or more zinc compounds that are convertible to zinc oxide under the conditions of preparation described herein. Examples of suitable zinc compounds include, but are not limited to, zinc sulfide, zinc sulfate, zinc hydroxide, zinc carbonate, zinc acetate, zinc nitrate, and the like and combinations thereof. Preferably, the zinc oxide is in the form of powdered zinc oxide.

The alumina used in preparing a sorbent support composition of the present invention can be any suitable commercially available alumina material including, but not limited to, colloidal alumina solutions and generally those alumina compounds produced by the dehydration of alumina hydrates.

In preparing the sorbent support component of the subject invention, there is generally employed an amount of alumina in the range of about 1.0 to about 20 weight percent, preferably an amount in the range of about 5 to about 15 weight percent, based on the total weight of the sorbent support component.

The expanded perlite will generally be present in the sorbent support composition in an amount in the range of from about 10 to about 40 weight percent perlite based on the weight of the sorbent support composition, preferably in an amount in the range of from about 15 to about 30 weight percent.

The promoter component will generally be present in the sorbent composition in an amount in the range of from about 1.0 to about 60 weight percent promoter component based on the total weight of the sorbent composition, preferably in an amount in the range of from about 10 to about 30 weight percent promoter component. When the promoter component comprises a bimetallic promoter component, the bimetallic promoter component should comprise a ratio of the two metals forming such bimetallic promoter component in the range of from about 20:1 to about 1:20. In a presently preferred embodiment of the present invention, the promoter component is a bimetallic promoter component comprising nickel and cobalt in a weight ratio of about 1:1.

In the manufacture of a sorbent composition of the present invention, the support component is generally prepared by combining the components of the support component, zinc oxide, expanded perlite, and alumina in appropriate proportions by any suitable method or manner which provides for the intimate mixing of such components to thereby provide a substantially homogeneous mixture comprising zinc oxide, expanded perlite, and alumina. Any suitable means for mixing the components of the support component can be used to achieve the desired dispersion of such components. Examples of suitable mixing means include, but are not limited to, mixing tumblers, stationary shells or troughs, Muller mixers, which are of the batch or continuous type, impact mixers, and the like. It is presently preferred to use a Muller mixer in the mixing of the components of the support component.

The components of the support component are mixed to provide a resulting mixture which can be in a form selected from the group consisting of wet mix, dough, paste, slurry, and the like. Such resulting mixture can then be shaped to form a particulate selected from the group consisting of a granule, an extrudate, a tablet, a sphere, a pellet, or a microsphere. For example, if the resulting mixture is in the form of a wet mix, the wet mix can be densified, dried under a drying condition as disclosed herein, calcined under a calcining condition as disclosed herein, and thereafter shaped, or particulated, through the granulation of the densified, dried, calcined mix to form granulates. Also for example, when the mixture of the components of the support component results in a form of a mixture which is either in a dough state or paste state, such mixture can then be shaped, preferably extruded, to form a particulate, preferably cylindrical extrudates having a diameter in the range of from about 1/32 inch to 1/2 inch and any suitable length, preferably a length in the range of from about 1/8 inch to about 1 inch. The resulting particulates, preferably cylindrical extrudates, are then dried under a drying condition as disclosed herein and then calcined under a calcining condition as disclosed herein. More preferably, when the mix is in the form of a slurry, the particulation of such slurry is achieved by spray drying the slurry to form microspheres thereof having a size in the range of from about 20 to about 500 microns. Such microspheres are then subjected to drying under a drying condition as disclosed herein and calcining under a calcining condition as disclosed herein.

When the particulation is achieved by preferably spray drying, a dispersant component may be utilized and can be any suitable compound that helps to promote the spray drying ability of the mix which is preferably in the form of a slurry. In particular, these components are useful in preventing deposition, precipitation, settling, agglomerating, adhering, and caking of solid particles in a fluid medium. Suitable dispersants include condensed phosphates, sulfonated polymers, and combinations thereof. The term condensed phosphates refers to any dehydrated phosphate where the $H_2O:P_2O_5$ is less than about 3:1. Specific examples of suitable dispersants include sodium pyrophosphate, sodium metaphosphate, sulfonated styrene maleic anhydride polymer, and combinations thereof. The amount of a dispersant component used is generally in the range of from about 0.01 weight percent based on the total weight of the components to about 10 weight percent. Preferably, the amount of a dispersant component used is generally in the range of from about 0.1 weight percent to about 8 weight percent.

The alumina component of the base support can be any suitable compound of alumina that has cement-like properties which can help to bind the particulate composition together. Presently preferred is alumina, preferably peptized alumina.

In the practice of the present invention, it is presently preferred that the sorbent composition be formed through spray drying. In preparing the preferred spray-dried sorbent composition, an acid component can be used. In general, the acid component can be an organic acid or a mineral such as nitric acid. If the acid component is an organic acid, it is preferred to be a carboxylic acid. If the acid component is a mineral acid, it is preferred to be a nitric acid or a phosphoric acid. Mixtures of these acids can also be used. Generally, the acid is used with water to form a dilute aqueous acid solution. The amount of acid in the acid component is generally in the range of from about 0.01 volume percent based on the total volume of the acid component to about 20 volume percent.

In preparing the preferred spray-dried sorbent composition a base support component, comprising zinc oxide, expanded perlite, and alumina can be contacted together in any manner known in the art that will form a mixture that is a liquid solution, a slurry, or a paste that is capable of being dispersed in a fluid-like spray. When a base support component is a solid, then it should be contacted in a liquid medium to form a mixture that is a liquid solution, a slurry, or a paste that is capable of being dispersed in a fluid-like spray. Suitable means for contacting these components are known in the art such as, for example, tumblers, stationary shells, troughs, Muller mixers, impact mixers, and the like.

Generally, these components, after contacting to form a mixture, are contacted with an acid component as described hereinabove. However, the dry components and the acid component can be contacted together simultaneously or separately.

After the components are contacted together to form a mixture, they are subjected to spray drying to form a spray-dried sorbent material having particles, preferably in the form of micro-spheres, that have a mean particle size in the ranges as disclosed herein. Spray drying is known in the art and is discussed in *Perry's Chemical Engineers' Handbook*, Sixth Edition, published by McGraw-Hill, Inc., at pages 20–54 through 20–58, which pages are incorporated herein by reference. Additional information can be obtained from the Handbook of Industrial Drying, published by Marcel Dekker Inc., at pages 243 through 293.

The spray-dried sorbent material can then be dried under a drying condition as disclosed herein and then calcined, preferably in an oxidizing atmosphere such as in the presence of oxygen or air, under a calcining condition as disclosed herein to form a calcined, spray-dried sorbent material. The calcination can be conducted under any suitable condition that removes residual water and oxidizes any combustibles. Usually, the spray-dried base sorbent material is calcined in an oxygen-containing atmosphere.

Generally, the spray-dried sorbent material has a mean particle size in the range of from about 10 micrometers to about 1000 micrometers, preferably in the range of from about 20 micrometers to about 150 micrometers.

The term "mean particle size" refers to the size of the particulate material as determined by using a RO-TAP® Testing Sieve Shaker, manufactured by W.S. Tyler Inc., of Mentor, Ohio, or other comparable sieves. The material to be measured is placed in the top of a nest of standard eight inch diameter stainless steel frame sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size.

The resulting particulate (preferably spray-dried) calcined support component comprising zinc oxide, crushed expanded perlite, and binder, preferably alumina, is then incorporated with a promoter component.

The promoter component which is useful in the practice of the present invention is promoter derived from one or more metals, metal oxides, or metal oxide precursors wherein the metal is selected from the group consisting of cobalt, nickel, iron, manganese, zinc, copper, molybdenum, silver, tin, vanadium, and antimony. Presently preferred is a promoter component of nickel or cobalt or a mixture of cobalt and nickel.

Following the incorporating of the particulated, calcined support component, preferably by impregnation, with a promoter component, the resulting promoted particulates are then subjected to drying under a drying condition as disclosed herein and calcined under a calcining condition as disclosed herein prior to the subjecting of such dried, calcined, promoted particulates to reduction with a reducing agent, preferably hydrogen.

The promoter component(s) may be incorporated onto, or with, the particulated (preferably spray-dried), calcined support component by any suitable means or method(s) for incorporating the promoter component(s) onto, or with, a substrate material, such as the dried and calcined particulates, which results in the formation of a promoted sorbent composition which can then be dried under a drying condition as disclosed herein and calcined under a calcining condition as disclosed herein to thereby provide dried, calcined, promoted particulates. The dried, calcined, promoted particulates can then be subjected to reduction with a reducing agent, preferably hydrogen, to thereby provide a sorbent composition of the present invention. Examples of means for incorporating the promoter component include impregnating, soaking or spraying, and combinations thereof.

A preferred method of incorporating is impregnating using any standard incipient wetness impregnation technique (i.e., essentially completely filling the pores of a substrate material with a solution of the incorporating elements) for impregnating a substrate. A preferred method uses an impregnating solution comprising the desirable concentration of a promoter component so as to ultimately provide a promoted particulate which can then be subjected to drying and calcining followed by reduction with a reducing agent such as hydrogen. The impregnating solution can be any aqueous solution and amounts of such solution which suitably provides for the impregnation of the particulates of support component to give an amount of promoter component that provides, after reduction with a reducing agent, a reduced promoter component content sufficient to permit the removal of sulfur from cracked-gasoline or diesel fuel when such fluid is treated in accordance with a desulfurization process of the present invention.

It can be desirable to use an aqueous solution of a promoter component for the impregnation of the particulates. A preferred impregnating solution comprises an aqueous solution formed by dissolving a metal-containing compound, preferably such metal-containing compound is in the form of a metal salt, such as, a metal chloride, a metal nitrate, a metal sulfate, and the like and combinations thereof, in a solvent, such as, water, alcohols, esters, ethers, ketones, and combinations thereof.

The concentration of the metal promoter component in the aqueous solution can be in the range of from about 0.1 gram of metal promoter component per gram of aqueous solution to about 5 grams of metal promoter component per gram of aqueous solution. Preferably, the weight ratio of metal promoter component to the aqueous medium of such aqueous solution can be in the range of from about 1:1 to about 4:1 but, more preferably, it is in the range of from 1.5:1 to 3:1.

In preparing the spray-dried sorbent material, a promoter component can be added to the spray-dried sorbent material as a component of the original mixture, or they can be added after the original mixture has been spray dried and calcined. If a promoter component is added to the spray-dried sorbent material after it has been spray dried and calcined, the spray-dried sorbent material should be dried and calcined a second time. The spray-dried sorbent material is preferably dried a second time at a temperature generally in the range of from about 100° F. to about 650° F. Preferably, the spray-dried sorbent material can be dried a second time at a temperature generally in the range of from about 150° F. to about 600° F. and, more preferably, in the range of from 200° F. to 550° F. The time period for conducting the drying a second time is generally in the range of from about 0.5 hour to about 8 hours, preferably in the range of from about 1 hour to about 6 hours and, more preferably, in the range of from 1.5 hours to 4 hours. Such drying a second time is generally carried out at a pressure in the range of from about atmospheric (i.e., about 14.7 pounds per square inch absolute) to about 100 pounds per square inch absolute (psia), preferably about atmospheric. This spray-dried sorbent material is then calcined, preferably in an oxidizing atmosphere such as in the presence of oxygen or air, under a calcining condition as disclosed herein.

A preferred impregnating solution is formed by dissolving a metal-containing compound (such as nickel nitrate hexahydrate) in water. It is acceptable to use somewhat of an acidic solution to aid in the dissolution of the metal-containing compound. It is preferred for the particulates to be impregnated with a nickel component by use of a solution containing nickel nitrate hexahydrate dissolved in water.

Generally, a drying condition, as referred to herein, can include a temperature in the range of from about 180° F. to about 290° F., preferably in the range of from about 190° F. to about 280° F. and, most preferably, in the range of from 200° F. to 270° F. Such drying condition can also include a time period generally in the range of from about 0.5 hour to about 60 hours, preferably in the range of from about 1 hour to about 40 hours and, most preferably, in the range of from 1.5 hours to 20 hours. Such drying condition can also include a pressure generally in the range of from about atmospheric (i.e., about 14.7 pounds per square inch absolute) to about 150 pounds per square inch absolute (psia), preferably in the range of from about atmospheric to about 100 psia, most preferably about atmospheric, so long as the desired temperature can be maintained. Any drying methods(s) known to one skilled in the art such as, for example, air drying, heat drying, and the like and combinations thereof can be used.

Generally, a calcining condition, as referred to herein, can include a temperature in the range of from about 700° F. to about 1600° F., preferably in the range of from about 800° F. to about 1500° F. and, more preferably, in the range of from 900° F. to about 1400° F. Such calcining condition can also include a pressure, generally in the range of from about 7 pounds per square inch absolute (psia) to about 750 psia, preferably in the range of from about 7 psia to about 450 psia and, most preferably, in the range of from 7 psia to 150 psia, and a time period in the range of from about 1 hour to about 60 hours, preferably for a time period in the range of from about 2 hours to about 20 hours and, most preferably, for a time period in the range of from 3 hours to 15 hours.

Once the promoter component has been distributed on, or with, the particulated, calcined base support component, the desired reduced-valence promoter component sorbent is prepared by drying the resulting composition under a drying condition as disclosed herein followed by calcining under a calcining condition as disclosed herein to thereby provide dried, calcined, promoted particulates. The dried, calcined, promoted particulates are thereafter subjected to reduction with a suitable reducing agent, preferably hydrogen or an appropriate hydrocarbon so as to produce a composition having a substantially reduced-valence promoter component content therein, preferably a substantially zero content therein, with such zero valence promoter component being present in an amount sufficient to permit the removal of sulfur from a hydrocarbon-containing fluid such as cracked-gasoline or diesel fuel, according to the process disclosed herein.

A sorbent composition having a reduced-valence promoter component of the present invention is a composition that has the ability to react chemically and/or physically with sulfur. It is also preferable that the sorbent composition removes diolefins and other gum-forming compounds from cracked-gasoline.

A sorbent composition having a reduced-valence promoter component of the present invention comprises a promoter component that is in a substantially reduced valence state, preferably a zero valence state. Preferably, the reduced-valence promoter component is reduced nickel. The amount of reduced-valence promoter component, preferably reduced nickel, in a sorbent composition of the present invention is an amount which will permit the removal of sulfur from cracked-gasoline or diesel fuel. Such amounts of reduced-valence promoter component, preferably reduced nickel or cobalt or a mixture of nickel and cobalt are generally in the range of from about 1.0 to about 60 weight percent of the total weight of the sorbent composition (support composition plus promoter).

In one presently preferred embodiment of the present invention, the reduced nickel is present in an amount in the range of from about 15 to about 30 weight percent based on the total weight of the nickel and the reduced nickel has been substantially reduced to zero valence.

In another presently preferred embodiment of the present invention, zinc oxide is present in an amount in the range of from about 40 to about 80 weight percent zinc oxide based on the total weight of the sorbent support, expanded perlite is present in an amount in the range of from about 10 to about 30 weight percent expanded perlite based on the total weight of the sorbent support, and alumina is present in an amount in the range of from about 1.0 to about 20 weight percent based on the total weight of the sorbent support, and promoter metal is present prior to reduction in an amount in the range of from about 10 to about 30 weight percent promoter metal based on the total weight of the composition.

The sorbent compositions of the present invention, which are useful in the desulfurization process of the present invention, can be prepared by a process comprising:

(a) mixing a support component preferably comprising zinc oxide, expanded perlite, and alumina, so as to form a mixture selected from the group consisting of a wet mix, a dough, a paste, a slurry, and the like and combinations thereof;

(b) particulating, preferably spray-drying, the mixture to form particulates selected from the group consisting of granules, extrudates, tablets, pellets, spheres, micro-spheres, and the like and combinations thereof, preferably micro-spheres;

(c) drying the particulate under a drying condition as disclosed herein to form a dried particulate;

(d) calcining the dried particulate under a calcining condition as disclosed herein to form a calcined particulate;

(e) incorporating, preferably impregnating, the calcined particulate with a promoter component thereof to form a promoted particulate;

(f) drying the promoted particulate under a drying condition as disclosed herein to form a dried, promoted particulate;

(g) calcining the dried, promoted particulate under a calcining condition as disclosed herein to form a calcined, promoted particulate; and (h) reducing the calcined, promoted particulate with a suitable reducing agent so as to produce a sorbent composition having a reduced-valence promoter component content therein, preferably a reduced-valence nickel content therein, and wherein the reduced-valence promoter component content is present in an amount effective for the removal of sulfur from a hydrocarbon-containing fluid such as cracked-gasoline or diesel fuel when such hydrocarbon-containing fluid is contacted with a sorbent composition(s) of the present invention according to a process(es) of the present invention.

A process of using a novel sorbent composition(s) of the present invention to desulfurize a hydrocarbon-containing fluid, such as cracked-gasoline or diesel fuel, to provide a desulfurized cracked-gasoline or diesel fuel comprises:

(a) desulfurizing, in a desulfurization zone, a hydrocarbon-containing fluid selected from the group consisting of cracked-gasoline, diesel fuel, with a sorbent composition of the present invention;

(b) separating the desulfurized hydrocarbon-containing fluid from the resulting sulfurized sorbent composition;

(c) regenerating at least a portion of the sulfurized sorbent composition to produce a regenerated, desulfurized, sorbent composition;

(d) reducing at least a portion of the regenerated, desulfurized, sorbent composition to produce a reduced, regenerated, desulfurized sorbent composition; and (e) returning at least a portion of the reduced, regenerated, desulfurized sorbent composition to the desulfurization zone.

The desulfurizing step (a) of the present invention is carried out under a set of conditions that includes total pressure, temperature, weight hourly space velocity, and hydrogen flow. These conditions are such that the sorbent composition can desulfurize the hydrocarbon-containing fluid to produce a desulfurized hydrocarbon-containing fluid and a sulfurized sorbent composition.

In carrying out the desulfurization step of a process of the present invention, it is preferred that the cracked-gasoline or diesel fuel be in a gas or vapor phase. However, in the practice of the present invention, it is not essential that such hydrocarbon-containing fluid be totally in a gas or vapor phase.

The total pressure can be in the range of from about 15 pounds per square inch absolute (psia) to about 1500 psia. However, it is presently preferred that the total pressure be in a range of from about 50 psia to about 500 psia.

In general, the temperature should be sufficient to keep the hydrocarbon-containing fluid in essentially a vapor or gas phase. While such temperatures can be in the range of from about 100° F. to about 1000° F., it is presently preferred that the temperature be in the range of from about 400° F. to about 800° F. when treating a cracked-gasoline, and in the range of from about 500° F. to about 900° F. when treating a diesel fuel.

Weight hourly space velocity ("WHSV") is defined as the numerical ratio of the rate at which a hydrocarbon-containing fluid is charged to the desulfurization zone in pounds per hour at standard condition of temperature and pressure ("STP") divided by the pounds of sorbent composition contained in the desulfurization zone to which the hydrocarbon-containing fluid is charged. In the practice of the present invention, such WHSV should be in the range of from about 0.5 $hr^{-1}$ to about 50 $hr^{-1}$, preferably in the range of from about 1 $hr^{-1}$ to about 20 $hr^{-1}$.

In carrying out the desulfurizing step, it is presently preferred that an agent be employed which interferes with any possible chemical or physical reacting of the olefinic and aromatic compounds in the hydrocarbon-containing fluid which is being treated with the solid reduced metal containing sorbent composition. Preferably, such agent is hydrogen.

Hydrogen flow in the desulfurization zone is generally such that the mole ratio of hydrogen to hydrocarbon-containing fluid is the range of from about 0.1 to about 10, preferably in the range of from about 0.2 to about 3.

The desulfurization zone can be any zone wherein desulfurization of cracked-gasoline or diesel fuel can take place. Examples of suitable zones are fixed bed reactors, moving bed reactors, fluidized bed reactors, transport reactors, and the like. Presently, a fluidized bed reactor or a fixed bed reactor is preferred.

If desired, during the desulfurization of the cracked-gasoline or diesel fuel, diluents such as methane, carbon dioxide, flue gas, nitrogen, and the like and combinations thereof can be used. Thus, it is not essential to the practice of the present invention that a high purity hydrogen be employed in achieving the desired desulfurization of a hydrocarbon-containing fluid such as cracked-gasoline or diesel fuel.

It is presently preferred when utilizing a fluidized bed reactor system that a sorbent composition be used having a particle size in the range of from about 10 micrometers to about 1000 micrometers. Preferably, such sorbent composition should have a particle size in the range of from about 20 micrometers to about 500 micrometers, and, more preferably, in the range of from 30 micrometers to 400 micrometers. When a fixed bed reactor system is employed for the practice of a desulfurization process(s) of the present invention, the sorbent composition should generally have a particle size in the range of from about 1/32 inch to about 1/2 inch diameter, preferably in the range of from about 1/32 inch to about 1/4 inch diameter.

It is further presently preferred to use a sorbent composition having a surface area in the range of from about 1 square meter per gram ($m^2/g$) to about 1000 square meters per gram of sorbent composition, preferably in the range of from about 1 $m^2/g$ to about 800 $m^2/g$.

The separation of the desulfurized hydrocarbon-containing fluid, preferably gaseous or vaporized desulfurized cracked gasoline or diesel fuel and sulfurized sorbent composition, can be accomplished by any manner known in the art that can separate a solid from a gas. Examples of such means are cyclonic devices, settling chambers, impingement devices for separating solids and gases, and the like and combinations thereof. The desulfurized gaseous cracked-gasoline or desulfurized gaseous diesel fuel, can then be recovered and preferably liquefied. Liquification of such desulfurized hydrocarbon-containing fluid can be accomplished by any manner known in the art.

The gaseous cracked-gasoline or gaseous diesel fuel, suitable as a feed in a process(es) of the present invention is a composition that contains, in part, olefins, aromatics, sulfur, as well as paraffins and naphthenes.

The amount of olefins in gaseous cracked-gasoline is generally in the range of from about 10 to about 35 weight percent olefins based on the total weight of the gaseous cracked-gasoline. For diesel fuel there is essentially no olefin content.

The amount of aromatics in gaseous cracked-gasoline is generally in the range of from about 20 to about 40 weight percent aromatics based on the total weight of the gaseous cracked-gasoline. The amount of aromatics in gaseous diesel fuel is generally in the range of from about 10 to about 90 weight percent aromatics based on the total weight of the gaseous diesel fuel.

The amount of sulfur in the hydrocarbon-containing fluid, i.e. cracked-gasoline or diesel fuel, suitable for use in a process of the present invention can be in the range of from about 100 parts per million sulfur by weight of the cracked-gasoline to about 10,000 parts per million sulfur by weight of the cracked-gasoline and from about 100 parts per million sulfur by weight of the diesel fuel to about 50,000 parts per million sulfur by weight of the diesel fuel prior to the treatment of such hydrocarbon-containing fluid with a desulfurization process(es) of the present invention.

The amount of sulfur in the desulfurized cracked-gasoline or desulfurized diesel fuel, following treatment in accordance with a desulfurization process of the present invention, is less than about 100 parts per million (ppm) sulfur by weight of hydrocarbon-containing fluid, preferably less than about 50 ppm sulfur by weight of hydrocarbon-containing fluid, and more preferably less than about 5 ppm sulfur by weight of hydrocarbon-containing fluid.

In carrying out a process of the present invention, if desired, a stripper unit can be inserted before and/or after the regeneration of the sulfurized sorbent composition. Such stripper will serve to remove a portion, preferably all, of any hydrocarbon from the sulfurized sorbent composition. Such stripper can also serve to remove oxygen and sulfur dioxide from the system prior to introduction of the regenerated sorbent composition into the sorbent activation zone (i.e., sorbent reduction zone). The stripping comprises a set of conditions that includes total pressure, temperature, and stripping agent partial pressure.

Preferably, the total pressure in a stripper, when employed, is in the range of from about 25 pounds per square inch absolute (psia) to about 500 psia.

The temperature for such stripping can be in the range of from about 100° F. to about 1000° F.

The stripping agent is a composition that helps to remove a hydrocarbon(s) from the sulfurized sorbent composition. Preferably, the stripping agent is nitrogen.

The sorbent regeneration zone employs a set of conditions that includes total pressure and sulfur removing agent partial pressure. Total pressure is generally in the range of from about 25 pounds per square inch absolute (psia) to about 500 psia.

The sulfur removing agent partial pressure is generally in the range of from about 1 percent to about 25 percent of the total pressure.

The sulfur removing agent is a composition that helps to generate gaseous sulfur-containing compounds and oxygen-containing compounds such as sulfur dioxide, as well as to burn off any remaining hydrocarbon deposits that might be present. The preferred sulfur removing agent suitable for use in the sorbent regeneration zone is selected from oxygen-containing gases such as air.

The temperature in the sorbent regeneration zone is generally in the range of from about 100° F. to about 1500° F., preferably in the range of from about 800° F. to about 1200° F.

The sorbent regeneration zone can be any vessel wherein the desulfurizing or regeneration of the sulfurized sorbent composition can take place.

The desulfurized sorbent composition is then reduced in an activation zone with a reducing agent so that at least a portion of the promoter component content of the sorbent composition is reduced to produce a solid reduced-valence promoter component to permit the removal of sulfur from a cracked-gasoline or diesel fuel according to the inventive process disclosed herein.

In general, when practicing the present invention, the activation, i.e., reduction, of the desulfurized sorbent composition is carried out at a temperature in the range of from about 100° F. to about 1500° F. and at a pressure in the range of from about 15 pounds per square inch absolute (psia) to about 1500 psia. Such reduction is carried out for a time sufficient to achieve the desired level of promoter component reduction contained in the skin of the sorbent composition. Such reduction can generally be achieved in a time period in the range of from about 0.01 hour to about 20 hours.

Following the activation, i.e., reduction, of the regenerated sorbent composition, at least a portion of the resulting activated (i.e., reduced) sorbent composition can be returned to the desulfurization zone.

When carrying out the process of the present invention, the steps of desulfurization, regeneration, activation (i.e., reduction), and optionally stripping before and/or after such regeneration can be accomplished in a single zone or vessel or in multiple zones or vessels.

When carrying out the process of the present invention in a fixed bed reactor system, the steps of desulfurization, regeneration, activation, and optionally stripping before and/or after such regeneration are accomplished in a single zone or vessel.

The desulfurized cracked-gasoline can be used in the formulation of gasoline blends to provide gasoline products suitable for commercial consumption and can also be used where a cracked-gasoline containing low levels of sulfur is desired.

The desulfurized diesel fuel can be used in the formulation of diesel fuel blends to provide diesel fuel products.

EXAMPLES

The following examples are intended to be illustrative of the present invention and to teach one of ordinary skill in the art to make and use the invention. These examples are not intended to limit the invention in any way.

Example I

A solid reduced nickel sorbent system was produced by mixing 10% alumina (Vista Dispal), 40% diatomaceous earth (World Chemical), and 50% zinc oxide with water at 42% solids using tetra sodium pyrophosphate (TSPP) as the dispersing agent.

The resulting slip was spray dried using a Niro Mobil Minor Spray Drier fitted with a 0.035 inch air cap and a 0.35 inch fountain head nozzle. The inlet temperature was 320° C. and the outlet temperature was 150° C. Air flow through the nozzle was 70 liters per minute. The slip was delivered at approximately 43 cc/min $H_2O$.

The spray dried product was dried in air using a muffle furnace at a temperature of 150° C. for 1 hour and then calcined at a temperature of 635° C. for a period of 1 hour.

The resulting calcined composition was screened to remove fines<40 microns and oversized particles of>250 microns.

The screened sorbent was impregnated with 12% nickel (as the metal) using melted nickel nitrate hexahydrate in 5% water to get it to melt/dissolve. The resulting solution was then sprayed onto the sorbent using a Sono-Tec sprayer while the sorbent particles were rotated in a baffled cement mixer type drum. The nickel impregnated sorbent was again calcined at a temperature of 635° C. for 1 hour.

The calcined 12% nickel sorbent composition was again impregnated with 15% nickel as carried out supra.

The resulting 27% nickel impregnated sorbent was then calcined at a temperature of 635° C. for a period of 1 hour to provide a 30% (by weight) of a nickel impregnated sorbent system.

The resulting impregnated sorbent system has a Davison attrition resistance value of 19.26.

Example II 10 grams of the sorbent as prepared in Example I were placed in a ½ inch diameter quartz tube having a length of about 12 inches and having a glass frit positioned above the lower ⅓ thereof so as to provide an inert support for the bed of sorbent which was placed thereon.

During each cycle, gaseous cracked-gasoline was pumped upwardly through the reactor at a rate of 13.6 ml per hour. The gaseous cracked-gasoline had a motor octane number of 80.6 (MON) or a research octane number of 92.1 (RON), an olefin content of 21.2 weight percent, 340 parts per million sulfur by weight sulfur-containing compounds based on the total weight of the gaseous cracked-gasoline and about 0.03 weight percent thiophenic compounds based on the weight of sulfur-containing compounds in the gaseous cracked-gasoline.

During each cycle, the reactor was maintained at a temperature of 700° F. and a pressure of 15 pounds per square inch absolute (psia). Hydrogen flow was at 150 standard cubic centimeters per minute (sccm) diluted with 150 sccum of nitrogen.

Before cycle 1 was initiated, the sorbent was reduced with hydrogen flowing at a rate of 300 sccm at a temperature of 700° F. for a period of one hour. Each cycle consisted of four hours with the product sulfur (ppm) for each cycle measured at one hour intervals over each four-hour cycle period. After each cycle, the sorbent was regenerated at 900° F. for two hours with a mixture of oxygen and nitrogen containing four volume percent oxygen, then purged with nitrogen (regeneration), and then reduced in hydrogen flowing at a rate of 300 cc for one hour at 700° F. (activation).

The sorbent compositions were each tested over 2 cycles. Each cycle utilized a mixture of 150 sccm hydrogen and 150 sccm nitrogen and 350 sccm/hydrocarbon.

The following results were obtained:

| Cycle | 1 | 2 |
|---|---|---|
| PPM Sulfur | 10 | 5 |
| PPM Sulfur | 20 | 20 |
| PPM Sulfur | 25 | 15 |
| PPM Sulfur | 20 | 15 |

Example III

A solid reduced nickel sorbent system was produced by mixing 13.75% alumina (nitric acid peptized Condea Disperal), 17.25% milled expanded perlite (R/F 27M), and 69% zinc oxide with water at 42% solids using ammonium polyacrylate as the dispersing agent.

The resulting slip was spray dried using a Niro Mobil Minor Spray Drier fitted with a 0.035 inch air cap and a 0.35 inch fountain head nozzle. The inlet temperature was 320° C. and the outlet temperature was 150° C. Air flow through the nozzle was 70 liters per minute. The slip was delivered at approximately 43 cc/min $H_2O$.

The spray dried product was dried in air using a muffle furnace at a temperature of 150° C. for 1 hour and then calcined at a temperature of 635° C. for a period of 1 hour.

The resulting calcined composition was screened to remove fines<40 microns and oversized particles of >250 microns.

The screened sorbent was impregnated with 15% nickel (as the metal) using melted nickel nitrate hexahydrate in 5% water to get it to melt/dissolve. The resulting solution was then sprayed onto the sorbent using a Sono-Tec sprayer while the sorbent particles were rotated in a baffled cement mixer type drum. The nickel impregnated sorbent was again calcined at a temperature of 635° C. for 1 hour.

One half of the resulting calcined 15% nickel sorbent composition was again impregnated with 15% nickel as carried out supra.

The resulting 30% nickel impregnated sorbent was then calcined at a temperature of 635° C. for a period of 1 hour to provide a 30% (by weight) of a nickel impregnated sorbent system.

The resulting impregnated sorbent system has a Davison attrition resistance value of 10.

Example IV 10 grams of each of the sorbents as prepared in Example III (15% and 30% nickel) were separately placed in ½ inch diameter quartz tubes having a length of about 12 inches and having a glass frit positioned above the lower ⅓ thereof so as to provide an inert support for the bed of sorbent which was placed thereon in each of the quartz tubes.

During each cycle, gaseous cracked-gasoline was pumped upwardly through the reactor at a rate of 13.6 ml per HR. The gaseous cracked-gasoline had a motor octane number of 80.6 (MON) or a research octane number of 92.4 (RON), an olefin content of 21.2 weight percent, 340 parts per million sulfur by weight sulfur containing compound based on the total weight of the gaseous cracked-gasoline and about 0.03 weight percent thiophenic compounds based on the weight of sulfur-containing compounds in the gaseous cracked-gasoline.

During each cycle, the reactor was maintained at a temperature of 700° F. and a pressure of 15 pounds per square inch absolute (psia). Hydrogen flow was at 150 standard cubic centimeters per minute (sccm) diluted with 150 sccm of nitrogen.

Before cycle 1 was initiated, the sorbent was reduced with hydrogen flowing at a rate of 300 sccm at a temperature of 700° F. for a period of one hour. Each cycle consisted of four hours with the product sulfur (ppm) for each cycle measured at one hour intervals over each four-hour cycle period. After each cycle, the sorbent was regenerated at 900° F. for two hours with a mixture of oxygen and nitrogen containing four volume percent oxygen, then purged with nitrogen (regeneration) and then reduced in hydrogen flowing at a rate of 300 cc for one hour at 700° F. (activation).

The following results were obtained:

TABLE 1

| PPM Sulfur in Cracked-Gasoline Using 15% Ni Sorbent System | | | | | |
|---|---|---|---|---|---|
| Cycle | 1 | 2 | 3 | 4 | 5 |
| ppm sulfur | 5 | 5 | 10 | <5 | 5 |
| ppm sulfur | 5 | 5 | 5 | <5 | <5 |
| ppm sulfur | 5 | 5 | 10 | 10 | <5 |
| ppm sulfur | <5 | <5 | | | |

TABLE 2

PPM Sulfur in Cracked-Gasoline Using 30% Ni Sorbent System

| Sorption Cycle | 1 | 2 | 3 | 4 | 5 |
|---|---|---|---|---|---|
| ppm sulfur | <5 | <5 | <5 | 5 | <5 |
| ppm sulfur | <5 | <5 | 10 | 5 | 5 |
| ppm sulfur | <5 | 5 | <5 | <5 | 5 |

The above data clearly demonstrate that the sorbent system of the present invention provides a system for the ready removal of sulfur from a hydrocarbon containing fluid such as cracked-gasoline.

In addition, due to the low Davison attrition value of the sorbent systems of Example III, there is provided an operable sorbent system which is attrition resistant and thus capable of extended use prior to the need for replacement of same.

Use of the milled expanded perlite in the formation of the sorbent systems of Example III provided a sorbent composition which has only two thirds the packing density of the sorbent system of Example I, and thus takes only two thirds the weight to fill the same volume. Moreover, the majority of the pore volume of the resulting composition was as macropores which in turn provided a system most suitable for the removing of gasoline sulfur.

Reasonable variations, modifications, and adaptations can be made within the scope of this disclosure and the appended claims without departing from the scope of this invention.

That which is claimed is:

1. A calcined and reduced sorbent composition suitable for removal of elemental sulfur and sulfur compounds from cracked-gasoline and diesel fuels which prior to calcining and reduction is comprised of:
   (a) zinc oxide;
   (b) expanded perlite;
   (c) alumina; and
   (d) a promoter metal
wherein said promoter metal is present in an amount which will effect the removal of sulfur or sulfur compounds from a stream of cracked-gasoline or diesel fuel when contacted with same under desulfurization conditions and at least a portion of said promoter metal is present in a zero valence state.

2. A sorbent composition in accordance with claim 1 wherein said promoter metal is at least one metal selected from the group consisting of nickel, cobalt, iron, manganese, copper, zinc, molybdenum, tungsten, silver, antimony, and vanadium.

3. A sorbent composition in accordance with claim 2 wherein said calcined and reduced promoter metal is present in an amount in the range of about 1.0 to about 60 weight percent.

4. A sorbent composition in accordance with claim 2 wherein prior to calcining and reduction said zinc oxide is present in an amount in the range of about 10 to about 90 weight percent, said expanded perlite is present in an amount in the range of about 10 to about 40 weight percent, and said alumina is present in an amount in the range of about 5 to about 30 weight percent, said weight percent being based on the weight of the sorbent support.

5. A sorbent composition in accordance with claim 4 wherein said zinc oxide is present in an amount of about 48.3 weight percent, said expanded perlite is present in an amount of about 12.08 weight percent, said alumina is present in an amount of about 9.63 weight percent, and said promoter metal is present in an amount of about 30 weight percent based on the total weight of the sorbent composition.

6. A sorbent composition in accordance with claim 2 wherein said promoter metal is nickel.

7. A sorbent composition in accordance with claim 2 wherein said promoter metal is cobalt.

8. A sorbent composition in accordance with claim 2 wherein said promoter metal is a mixture of nickel and cobalt.

9. A sorbent composition in accordance with claim 1 wherein said expanded perlite is milled.

10. A sorbent composition in accordance with claim 1 wherein said composition is a particulate in the form of one of granule, extrudate, tablet, sphere, pellet, or microsphere.

11. A sorbent composition in accordance with claim 10 wherein said particulate is a microsphere.

12. A process for the production of a sorbent composition for the removal of elemental sulfur or sulfur compounds from a cracked-gasoline or diesel fuel stream which comprises:
   (a) admixing zinc oxide, expanded perlite and alumina so as to form a mix thereof, wherein said mix is in a form of a wet mix, dough paste or slurry;
   (b) particulating the resulting mix to form a particulate thereof;
   (c) drying the particulate of step (b) to form a dried particulate;
   (d) calcining the dried particulate of step (c) to form a calcined particulate;
   (e) impregnating the resulting calcined particulate of step (d) with a promoter metal or promoter metal containing compound to form an impregnated particulate;
   (f) optionally, when the impregnating process of step (e) does not produce a dry, impregnated particulate, drying the impregnated particulate of step (e) to form a dried, impregnated particulate;
   (g) calcining the dried particulate of step (f) to form a calcined, impregnated particulate; and thereafter
   (h) reducing the resulting calcined, impregnated particulate of step (g) with a reducing agent under conditions to produce a particulate composition having a reduced promoter metal content such that the reduced metal containing composition will effect the removal of sulfur or sulfur compounds from the stream of a cracked-gasoline or diesel fuel when such stream is contacted with same under desulfurization conditions.

13. A process in accordance with claim 12 wherein said particulate composition is in the form of one of granules, extrudates, tablets, spheres, pellets, or microspheres.

14. A process in accordance with claim 12 wherein said particulate of step (b) is formed by spray drying of the mix of step (a).

15. A process in accordance with claim 12 wherein prior to calcining and reduction said zinc oxide is present in an amount in the range of about 10 to about 90 weight percent, said expanded perlite is present in an amount in the range of about 10 to about 40 weight percent, and said alumina is present in an amount in the range of about 1 to about 30 weight percent of the sorbent support composition.

16. A process in accordance with claim 12 wherein said calcined particulate is impregnated with a promoter derived from one or more metals, metal oxides or metal oxide precursors wherein the metal is selected from the group consisting of nickel, cobalt, iron, manganese, copper, zinc, molybdenum, tungsten, silver, tin, antimony, and vanadium.

17. A process in accordance with claim 16 wherein said calcined and reduced promoter metal is present in an amount in the range of about 1.0 to about 60 weight percent based on the total weight of the sorbent composition.

18. The sorbent product of the process of claim 17.

19. A process in accordance with claim 12 wherein said particulate is dried in steps (c) and (f) at a temperature in the range of about 150° F. to about 3500° F.

20. A process in accordance with claim 19 wherein said calcined and reduced promoter is nickel and is present in an amount of about 30 weight percent based on the total weight of the sorbent composition.

21. A process in accordance with claim 12 wherein said dried particulate is calcined in steps (d) and (g) at a temperature in the range of about 400 to about 1500° F.

22. A process in accordance with claim 12 wherein prior to calcining and reduction said zinc oxide is present in an amount in the range of about 40 to about 80 weight percent, said expanded perlite is present in an amount in the range of about 1 to about 30 weight percent, and said alumina is present in an amount in the range of about 1.0 to about 20 weight percent, and said promoter is present in an amount in the range of about 10 to about 30 weight percent.

23. The sorbent product of the process of claim 22.

24. A process in accordance with claim 12 wherein prior to calcining and reduction said zinc oxide is present in an amount of about 69 weight percent, said expanded perlite is present in an amount of about 17.25 weight percent, and said alumina is present in an amount in the range of about 5 to about 30 weight percent, said weight percent being based on the weight of the sorbent support.

25. A process in accordance with claim 24 wherein said calcined and reduced promoter is nickel and is present in an amount of about 12 weight percent based on the total weight of the sorbent composition.

26. A process in accordance with claim 12 wherein the reduction of the promoter metal is carried out at a temperature in the range of from about 100° F. to about 1500° F. and at a pressure in the range of about 15 to about 1500 psia for a time sufficient to permit the formation of the reduced promoter metal.

27. The sorbent product of the process of claim 12.

* * * * *